(12) United States Patent
Kawaguchi et al.

(10) Patent No.: US 10,839,692 B2
(45) Date of Patent: Nov. 17, 2020

(54) DRIVING SUPPORTER

(71) Applicant: TOYOTA JIDOSHA KABUSHIKI KAISHA, Toyota (JP)

(72) Inventors: Yoshihiro Kawaguchi, Toyota (JP); Iwao Izumikawa, Toyota (JP); Yuji Okuda, Toyota (JP); Kazuma Hashimoto, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 15/730,240

(22) Filed: Oct. 11, 2017

(65) Prior Publication Data

US 2018/0158338 A1 Jun. 7, 2018

(30) Foreign Application Priority Data

Dec. 7, 2016 (JP) .................... 2016-237433

(51) Int. Cl.
 *G08G 1/16* (2006.01)
 *B60W 30/095* (2012.01)
 (Continued)

(52) U.S. Cl.
 CPC ......... *G08G 1/167* (2013.01); *B60W 30/0956* (2013.01); *B60W 30/12* (2013.01);
 (Continued)

(58) Field of Classification Search
 CPC .. G08G 1/167; B60W 30/0956; B60W 30/12; B60W 50/14; B60W 2050/146; B60W 2400/00; B60W 2550/10; B60W 2750/30
 See application file for complete search history.

(56) References Cited

U.S. PATENT DOCUMENTS 6,388,565 B1  5/2002 Bernhard et al.
7,215,255 B2 * 5/2007 Grush ............... G06Q 30/0284
                                            340/932.2
(Continued)

FOREIGN PATENT DOCUMENTS

DE    199 21 449 C1    1/2001
DE  10 2005 025 387 A1   5/2006
(Continued)

*Primary Examiner* — Thomas E Worden
(74) *Attorney, Agent, or Firm* — Oliff PLC (57) ABSTRACT

A driving supporter includes: a departure-possibility-value obtainer that obtains a departure-possibility value; a relative positional relationship obtainer that detects another vehicle located diagonally at a rear of an own vehicle and obtain a relative positional relationship between them; a support executer that executes a lane-departure prevention support; and a support controller that controls the support executer to execute the lane-departure prevention support when the departure-possibility value is greater than or equal to a threshold value. The support controller includes a threshold-value determiner that determines the threshold value to a smaller value when the relative positional relationship is a set relationship than when the relative positional relationship is not the set relationship. The set relationship is a relationship in which there is a possibility of collision of the own vehicle with the other vehicle in an event of departure of the own vehicle from a lane.

5 Claims, 5 Drawing Sheets

(51) Int. Cl.
*B60W 30/12* (2020.01)
*B60W 50/14* (2020.01)

(52) U.S. Cl.
CPC ....... *B60W 50/14* (2013.01); *B60W 2050/146* (2013.01); *B60W 2400/00* (2013.01); *B60W 2554/00* (2020.02); *B60W 2754/10* (2020.02)

(56) References Cited

U.S. PATENT DOCUMENTS

| | | | | |
|---|---|---|---|---|
| 7,424,357 | B2* | 9/2008 | Ozaki | B60T 8/17557 |
| | | | | 340/903 |
| 2004/0016870 | A1* | 1/2004 | Pawlicki | B60W 30/18 |
| | | | | 250/208.1 |
| 2006/0077052 | A1* | 4/2006 | Matsuoka | G01S 13/56 |
| | | | | 340/471 |
| 2008/0300776 | A1* | 12/2008 | Petrisor | G08G 1/0112 |
| | | | | 701/118 |
| 2010/0141413 | A1 | 6/2010 | Suzuki | |
| 2012/0154135 | A1 | 6/2012 | Tronnier et al. | |
| 2012/0173530 | A1* | 7/2012 | Kurciska | G08G 1/0112 |
| | | | | 707/738 |
| 2012/0215594 | A1* | 8/2012 | Gravelle | G07B 15/02 |
| | | | | 705/13 |
| 2014/0002652 | A1* | 1/2014 | Gonzales | G07B 15/06 |
| | | | | 348/148 |
| 2014/0236686 | A1* | 8/2014 | Grush | G07B 15/02 |
| | | | | 705/13 |
| 2014/0310074 | A1* | 10/2014 | Gravelle | G07B 15/063 |
| | | | | 705/13 |
| 2015/0183430 | A1 | 7/2015 | Schwindt et al. | |
| 2015/0192666 | A1 | 7/2015 | Watanabe et al. | |
| 2016/0209219 | A1* | 7/2016 | Grush | H04W 4/029 |
| 2017/0166206 | A1* | 6/2017 | Lim | B60W 30/12 |
| 2017/0294127 | A1* | 10/2017 | Nakatani | G08G 1/16 |
| 2017/0349173 | A1* | 12/2017 | Nishiguchi | B60W 30/09 |
| 2018/0043935 | A1* | 2/2018 | Hashimoto | B62D 15/025 |
| 2019/0004513 | A1* | 1/2019 | Chiba | B60T 7/22 |
| 2019/0092333 | A1* | 3/2019 | Ishioka | B60W 30/095 |

FOREIGN PATENT DOCUMENTS

| | | |
|---|---|---|
| DE | 10 2010 063 420 A1 | 6/2012 |
| JP | 2006-331304 A | 12/2006 |
| JP | 2007-168662 A | 7/2007 |
| JP | 2008-171082 A | 7/2008 |
| JP | 2015-130098 A | 7/2015 |
| JP | 2016-536703 A | 11/2016 |

* cited by examiner

DRIVING SUPPORTER

CROSS REFERENCE TO RELATED APPLICATION

The present application claims priority from Japanese Patent Application No. 2016-237433, which was filed on Dec. 7, 2016, the disclosure of which is herein incorporated by reference in its entirety.

BACKGROUND

The following disclosure relates to a driving supporter configured to support driving.

Patent Document 1 (Japanese Patent Application Publication No. 2006-331304) and Patent Document 2 (Japanese Patent Application Publication No. 2007-168662) disclose driving supporters configured to support prevention of lane departure of a vehicle. In the driving supporter disclosed in Patent Document 1, an alert is output in the case where there is a possibility that an own vehicle as the vehicle departs from a lane and where a steering angle of a steering wheel is less than or equal to a threshold value. This threshold value is changed based on a front environment. For example, in the case where there is an object in front of the own vehicle, the own vehicle in most cases travels with avoidance of the object, and in this case it is determined whether there is a need for the own vehicle to depart from the lane. The threshold value is determined to a smaller value when it is determined that there is a need for the own vehicle to depart from the lane than when it is determined that there is no need for the own vehicle to depart from the lane. This determination makes it difficult to output unnecessary alerts.

Patent Document 3 (Japanese Patent Application Publication No. 2008-171082) and Patent Document 4 (Japanese Patent Application Publication No. 2015-130098) disclose driving supporters configured to: detect another vehicle located diagonally to the rear of an own vehicle; obtain a vehicle-to-vehicle distance and a collision estimated time as a relative positional relationship between the own vehicle and said another vehicle; and when the vehicle-to-vehicle distance is less than or equal to a set vehicle-to-vehicle distance and/or when the collision estimated time is less than or equal to a set estimated time, notify a driver of this situation.

SUMMARY

Accordingly, an aspect of the disclosure relates to a technique of increasing opportunities of execution of a lane-departure prevention support as a driving assist to improve safety.

One aspect of the disclosure relates to a driving supporter configured to: execute a lane-departure prevention support as a driving assist when a departure-possibility value that is a value representing a degree of a possibility of departure of an own vehicle from a lane is greater than or equal to a threshold value; and execute the lane-departure prevention support when a relative positional relationship between the own vehicle and another vehicle located diagonally to the rear of the own vehicle is a set relationship even in the case where the departure-possibility value is less than the threshold value. For example, the set relationship may be a relationship in which there is a high possibility of collision between the own vehicle and said another vehicle in the event of departure of the own vehicle from the lane. Thus, in the case where the relative positional relationship between the own vehicle and said another vehicle, even when the departure-possibility value is less than the threshold value, the lane-departure prevention support is executed in some cases. This configuration makes it possible to increase opportunities of execution of the lane-departure prevention support, resulting in improved safety.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described one embodiment by reference to the drawings.

Figure 1:
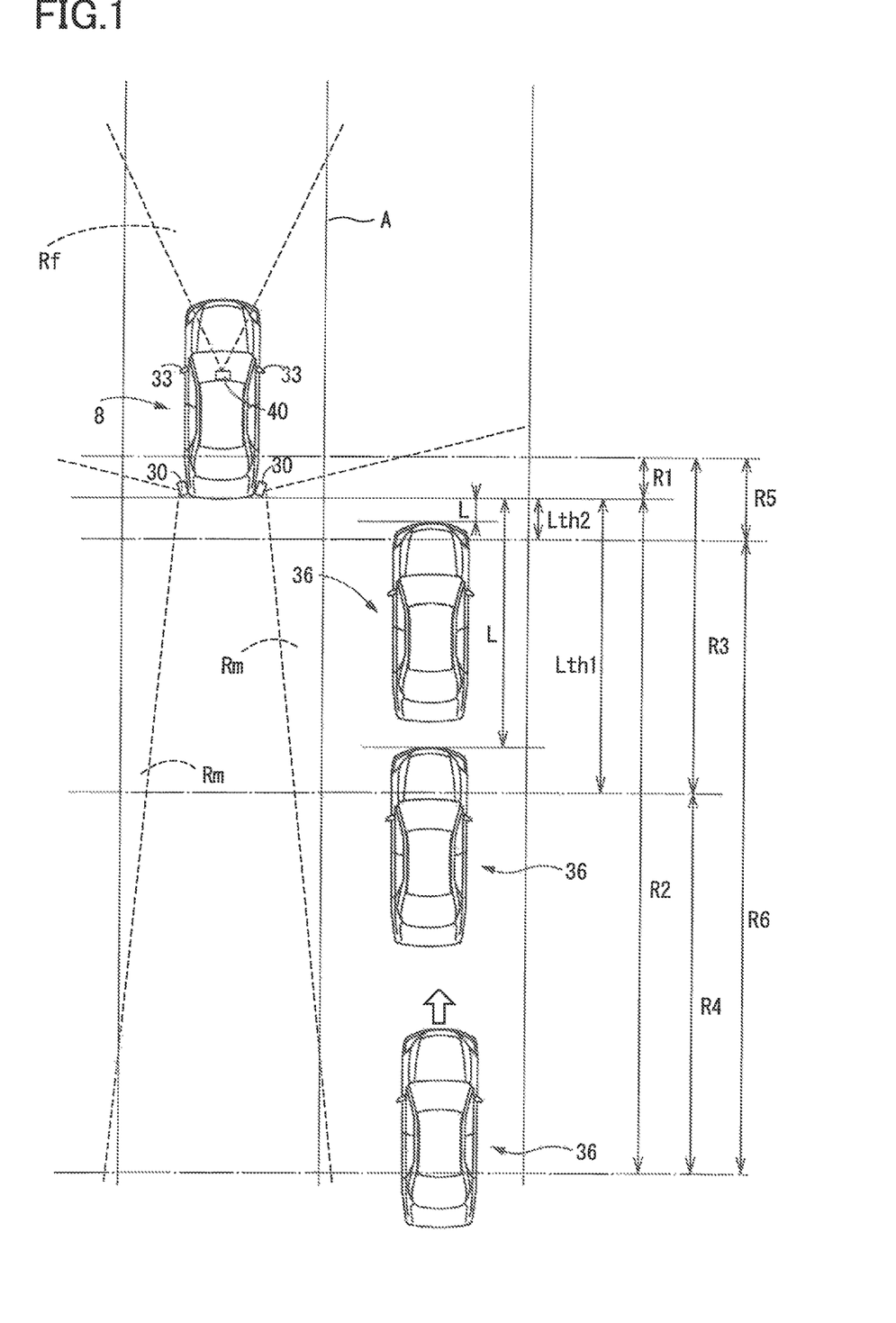
FIG. 1 is a view illustrating a relative positional relationship between an own vehicle and another vehicle, and a driving supporter according to one embodiment is installed in the own vehicle.
Figure 2:
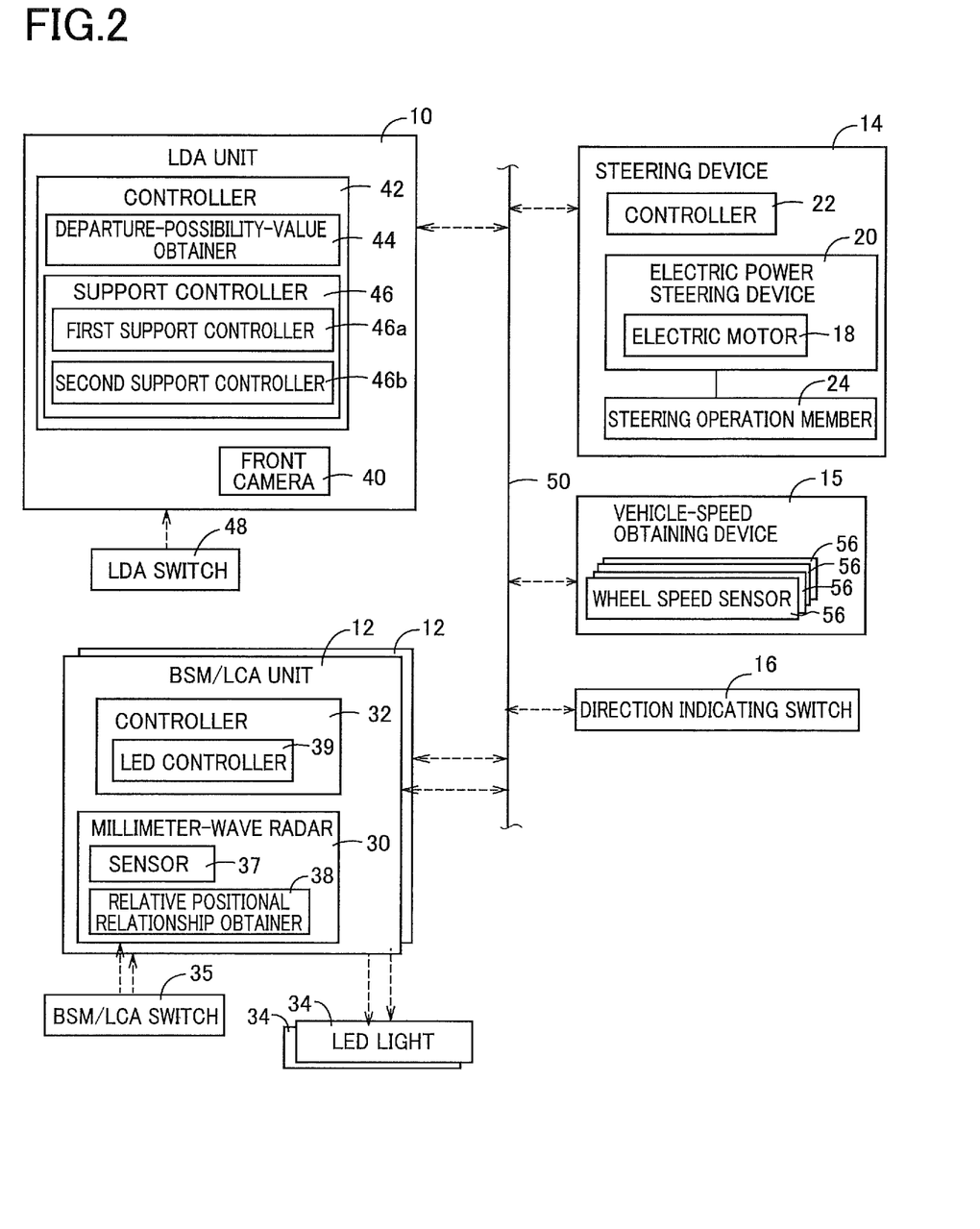
FIG. 2 is a block diagram conceptually illustrating the driving supporter.

FIG. 2 illustrates a driving supporter according to the present embodiment. The driving supporter is installed in an own vehicle 8 illustrated in FIG. 1. The driving supporter includes a lane-departure-alert (LDA) unit 10, blind-spot-monitor (BSM)/lane-change-alert (LCA) units 12, a steering device 14, a vehicle-speed obtaining device 15, and a direction indicating switch 16. An operator turns the direction indicating switch 16 on or off when changing a direction of travel of the own vehicle 8. The steering device 14 includes: an electric power steering device 20, as one example of a support executer, configured to use an output of an electric motor 18 to assist a driver with a steering operation; and a controller 22 mainly constituted by a computer. The electric power steering device 20 is configured to turn wheels of the vehicle by an operating force applied from the driver to a steering operation member 24 and the output of the electric motor 18. The controller 22 controls the electric motor 18 to control its output.

The BSM/LCA units 12 are respectively mounted on a rear portion of the own vehicle 8 at its opposite-side portions in a widthwise direction of the own vehicle 8. Each of the BSM/LCA units 12 includes a millimeter-wave radar 30 and a controller 32 mainly constituted by a computer. LED lights 34 respectively provided on right and left door mirrors 33 are connected to the respective BSM/LCA units 12. Also, a BSM/LCA switch 35 is connected to the BSM/LCA units 12. The BSM/LCA switch 35 is turned on by the driver in the case where BSM/LCA control is permitted.

The millimeter-wave radar 30 includes a sensor 37 and a relative positional relationship obtainer 38. The sensor 37 includes: an emitter configured to emit millimeter waves;

and a receiver configured to receive reflected waves. The relative positional relationship obtainer 38 detects another vehicle 36 located within a region Rm (see FIG. 1) based on the reflected waves received by the sensor 37. The relative positional relationship obtainer 38 obtains a relative positional relationship between the detected vehicle 36 and the own vehicle 8. The region Rm includes: a region (a region R1 illustrated in FIG. 1) located on a side of the rear portion of the own vehicle 8 in its widthwise direction (i.e., a lateral direction); and a region (a region R2) located at a rear of the own vehicle 8 and on a side of the own vehicle 8 in the widthwise direction (hereinafter may be referred to as "region located diagonally to the rear of the own vehicle 8"). That is, the millimeter-wave radar 30 enables detection of the vehicle 36 running on an adjacent lane at a position located diagonally to the rear of the own vehicle 8, for example. The relative positional relationship obtainer 38 obtains a collision estimated time (time to collision) TTC and a vehicle-to-vehicle distance L as a relative positional relationship between the detected vehicle 36 and the own vehicle 8, for example. Each of the vehicle-to-vehicle distance L and the collision estimated time TTC is obtained, assuming that the own vehicle 8 and the vehicle 36 are running on the same lane. The collision estimated time TTC is obtained by dividing the vehicle-to-vehicle distance L by a relative velocity and may also be referred to as "catch-up estimated time".

Each of the controllers 32 is mainly constituted by a computer and includes an executer, a storage, an input/output device, and a timer, not illustrated. The controller 32 includes an LED controller 39 configured to control an LED light 34 to illuminate or blink based on the vehicle-to-vehicle distance L and the collision estimated time TTC obtained by the relative positional relationship obtainer 38. In the present embodiment, in the case where the vehicle-to-vehicle distance L between the detected vehicle 36 and the own vehicle 8 is less than or equal to a first vehicle-to-vehicle distance Lth1, in other words, in the case where at least a portion of the vehicle 36 exists in a region R3 in FIG. 1 (which is a blind spot for the driver), the LED light 34 provided on one of the door mirrors 33 which is nearer to the vehicle 36 than the other is controlled to blink when the direction indicating switch 16 is ON and is controlled to illuminate when the direction indicating switch 16 is OFF. This operation may be hereinafter referred to as "the LED light 34 illuminates or blinks". This control may be hereinafter referred to as "BSM control". In the case where the detected vehicle 36 is located in a region R4 at a rear of the region R3 but running at a high relative velocity, and the collision estimated time TTC is less than or equal to a first estimated time Tth1, the LED light 34 provided on one of the door mirrors 33 which is located nearer to the vehicle 36 is controlled to illuminate or blink. This control may be referred to as "LCA control". In the present embodiment, each of the LED lights 34 is one example of an indicator, and each of the illumination and the blink of the LED light 34 is one example of indication as a driving assist.

Figure 5:
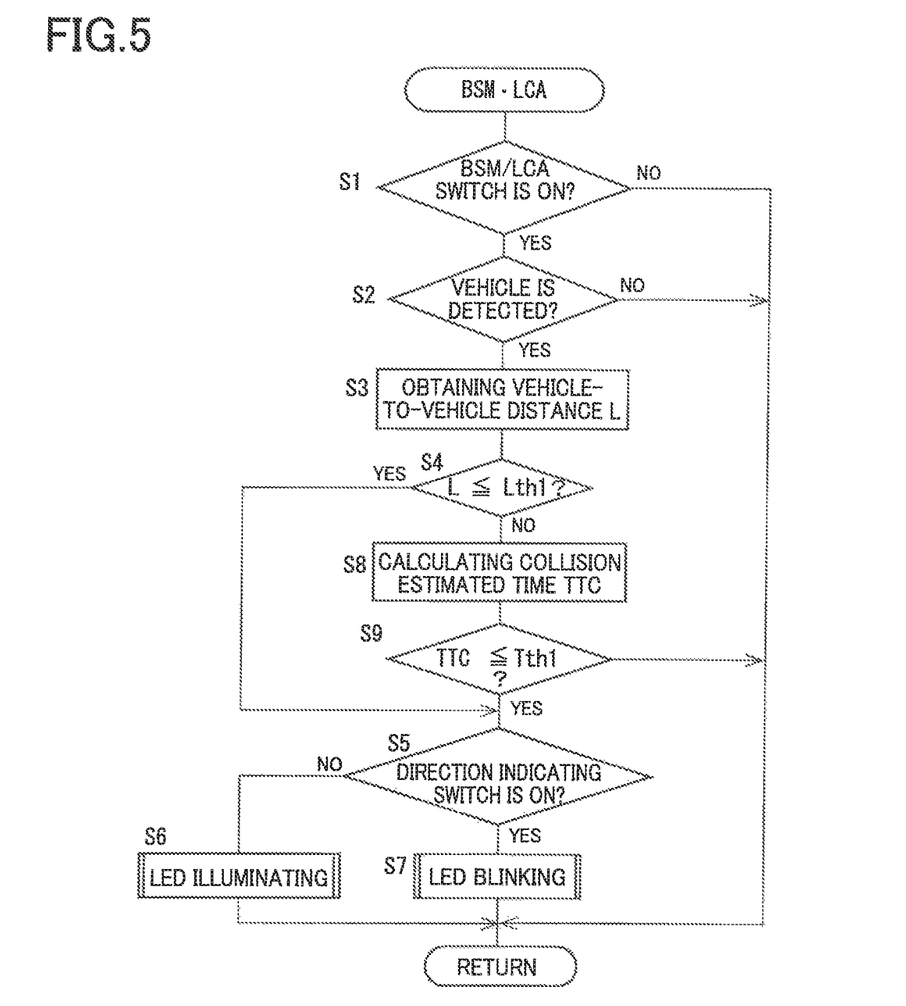
FIG. 5 is a flow chart illustrating a blind-spot-monitor (BSM)/lane-change-alert (LCA) program stored in a storage of a BSM/LCA unit of the driving supporter.

In the present embodiment, a BSM/LCA program represented by the flow chart in FIG. 5 is executed each time when a set length of time is elapsed. At S1, it is determined whether the BSM/LCA switch 35 is ON. When the BSM/LCA switch 35 is OFF, processings at S2 and subsequent steps are not executed. When the BSM/LCA switch 35 is ON, it is determined at S2 whether each of the BSM/LCA units 12 has detected the vehicle 36 in the region Rm. When the vehicle 36 is detected, the vehicle-to-vehicle distance L is obtained at S3, and it is determined at S4 whether the vehicle-to-vehicle distance L is less than or equal to the first vehicle-to-vehicle distance Lth1. When a positive decision (YES) is made at S4, it is determined at S5 whether the direction indicating switch 16 is ON. When the direction indicating switch 16 is OFF, the LED light 34 of one of the door mirrors 33 which is located nearer to the lane on which the vehicle 36 is running is controlled to illuminate at S6. When the direction indicating switch 16 is ON, the LED light 34 is controlled to blink at S7. In contrast, in the case where the vehicle-to-vehicle distance L is greater than the first vehicle-to-vehicle distance Lth1, the collision estimated time TTC is obtained at S8, and it is determined at S9 whether the collision estimated time TTC is less than or equal to the first estimated time Tth1. When a positive decision (YES) is made at S9, the LED light 34 is controlled to illuminate or blink at S5-S7.

Figure 4:
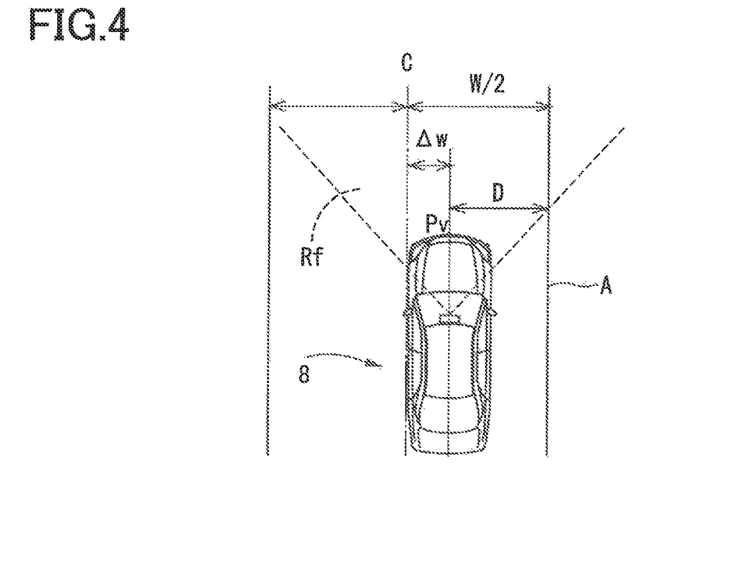
FIG. 4 is a view illustrating a relative positional relationship between the own vehicle and a lane boundary.

The LDA unit 10 includes a front camera 40 and a controller 42 mainly constituted by a computer. An LDA switch 48 is connected to the LDA unit 10. The LDA switch 48 is turned on when the driver allows the LDA. The front camera 40 is installed on an upper portion of a front glass of the own vehicle 8. The front camera 40 is capable of taking an image of a region Rf (see FIG. 1) located just and diagonally in front of the vehicle 8. The controller 42 is mainly constituted by a computer and includes an executer, a storage, an input/output device, and a timer, not illustrated. The controller 42 further includes a departure-possibility-value obtainer 44 and a support controller 46. The departure-possibility-value obtainer 44 is configured to obtain a departure-possibility value that is a value representing a degree of a possibility of departure of the own vehicle 8 from its lane. In the present embodiment, as illustrated in FIG. 4, the departure-possibility-value obtainer 44 obtains a closer distance D as the departure-possibility value. The closer distance D is a distance between a lane boundary (a lane line) A and a reference point Pv that is a predetermined point in the own vehicle 8. The lane boundary A is identified by processing of the image taken by the front camera 40, and the distance between the reference point Pv of the own vehicle 8 and the lane boundary A in the widthwise direction of the lane is obtained as the closer distance D, for example. The departure-possibility value is set to a larger value in the case where the closer distance D is short than in the case where the closer distance D is long.

It is noted that the departure-possibility-value obtainer 44 may obtain a lateral deviation amount Δw as the departure-possibility value. The lateral deviation amount Δw is an amount of deviation of the reference point Pv of the own vehicle 8 from a center line C of the lane in the lateral direction. The lateral deviation amount Δw is larger in the case where the closer distance D is short than in the case where the closer distance D is long. For example, in the case where the width of the lane on which the own vehicle 8 is running is defined as W (i.e., the distance between lane lines), the lateral deviation amount Δw may be obtained by subtracting the closer distance D from a half of the width W of the lane (Δw=W/2−D). The lateral deviation amount Δw and the closer distance D correspond to each other in this manner, and the amount of deviation of the own vehicle 8 in the lane in the lateral direction may be determined based on the closer distance D. Thus, it is possible to consider that the closer distance D is one example of a lateral deviation amount. The departure-possibility value is larger in the case where the lateral deviation amount Δw is large than in the case where the lateral deviation amount Δw is small. The reference point may be provided at a position near a headlight of the own vehicle 8.

The support controller 46 is configured to output a value for instructing control of the electric motor 18 of the electric power steering device 20 based on, e.g., the obtained departure-possibility value. In the present embodiment, the electric motor 18 applies a force directed in a direction in which departure of the own vehicle 8 from the lane is prevented. For example, the electric motor 18 applies a force having such a magnitude that turns the wheels slightly. This application of the force assists the driver in operation of the steering operation member 24 in the direction in which departure of the own vehicle 8 from the lane is prevented. In other words, a lane-departure prevention support as the driving assist is executed. This control will be referred to as "LDA control". It is noted that the magnitude of the force applied by the electric motor 18 may be greater in the case where the closer distance D is short than in the case where the closer distance D is long.

The controllers 22, 32, 42 and other similar devices are connected to each other via a controller area network (CAN) 50 so as to be communicable with each other. Devices connected to the CAN 50 further include the vehicle-speed obtaining device 15 and the direction indicating switch 16, for example. The vehicle-speed obtaining device 15 includes wheel speed sensors 56 respectively provided on the front left and right and rear left and right wheels. The vehicle-speed obtaining device 15 is configured to obtain the running speed of the own vehicle 8 based on the wheel speed of the four wheels.

In the own vehicle 8 configured as described above, the LDA control is executed in the case where the departure-possibility value of the own vehicle 8 is greater than or equal to a first threshold value, and the LDA control is also executed in the case where the BSM/LCA unit 12 has detected that the relative positional relationship between the own vehicle 8 and the vehicle 36 located diagonally at a rear of the own vehicle 8 is a set relationship even when the departure-possibility value is less than the first threshold value.

Specifically, in the case where the closer distance D is less than or equal to a first closer distance Dth1, it is determined that the departure-possibility value is greater than or equal to the first threshold value, and the LDA control is executed. For example, the first closer distance Dth1 may be set to a distance between the own vehicle 8 and the lane boundary A, which distance is short enough to consider that there is high need of execution of the lane-departure prevention support.

In the case where the closer distance D is greater than the first closer distance Dth1 and less than or equal to a second closer distance Dth2, it is determined that the departure-possibility value is greater than or equal to a second threshold value that is less than the first threshold value. In this case, the LDA control is executed in the case (a) where a state in which the vehicle-to-vehicle distance L between the own vehicle 8 and the vehicle 36 located diagonally to the rear of the own vehicle 8 is less than or equal to a second vehicle-to-vehicle distance Lth2 that is less than the first vehicle-to-vehicle distance Lth1 has continued for longer than or equal to a set parallel-run time T0, in other words, in the case where a state in which at least a portion of the vehicle 36 is located in a region R5 has continued for longer than or equal to the set parallel-run time T0, or in the case (b) where the collision estimated time TTC is less than or equal to a second estimated time Tth2 that is shorter than the first estimated time Tth1, in other words, in the case where the vehicle 36 is located in the region R6, but the speed of the vehicle 36 is high relative to the own vehicle 8. In the present embodiment, the relationship (a) or the relationship (b) is the set relationship. For example, the set relationship may be a relationship in which there is a high possibility of collision of the own vehicle 8 and the vehicle 36 in the event of departure of the own vehicle 8 from the lane. It is noted that the second closer distance Dth2 may be set to a distance that enables recognition of deviation of the own vehicle 8 in the lateral direction. This is because there is low need of execution of the lane-departure prevention support in the case where the own vehicle 8 is traveling substantially along the center line C of the lane even in the case where the relative positional relationship between the own vehicle 8 and the vehicle 36 is the set relationship.

It is possible to consider that the LDA control is executed in the case where the departure-possibility value is greater than or equal to the second threshold value, and the BSM control or the LCA control is to be executed. However, some drivers feel that the lane-departure prevention support is too early if the lane-departure prevention support is executed at the timing when the vehicle-to-vehicle distance L between the vehicle 36 and the own vehicle 8 becomes less than or equal to the first vehicle-to-vehicle distance Lth1 in the case where the departure-possibility value is less than the first threshold value. Also, some drivers feel that lane change is possible, and the lane-departure prevention support is annoying even in the case where the vehicle 36 is located in the region R5, for example, in the case where the running speed of the own vehicle 8 is greater than that of the vehicle 36. To solve this problem, in the present embodiment, the LDA control is executed in the case where the vehicle-to-vehicle distance L between the vehicle 36 and the own vehicle 8 is less than or equal to the second vehicle-to-vehicle distance Lth2, the relative velocity is low, and the own vehicle 8 and the vehicle 36 are running substantially in parallel.

It is noted that the BSM/LCA unit 12 detects whether the relative positional relationship between the own vehicle 8 and the vehicle 36 located diagonally to the rear of the own vehicle 8 is the relationship (a) or the relationship (b) even when the BSM/LCA switch 35 is OFF. In the case where the relative positional relationship is the relationship (a) or the relationship (b), a flag is switched to ON.

Figure 6:
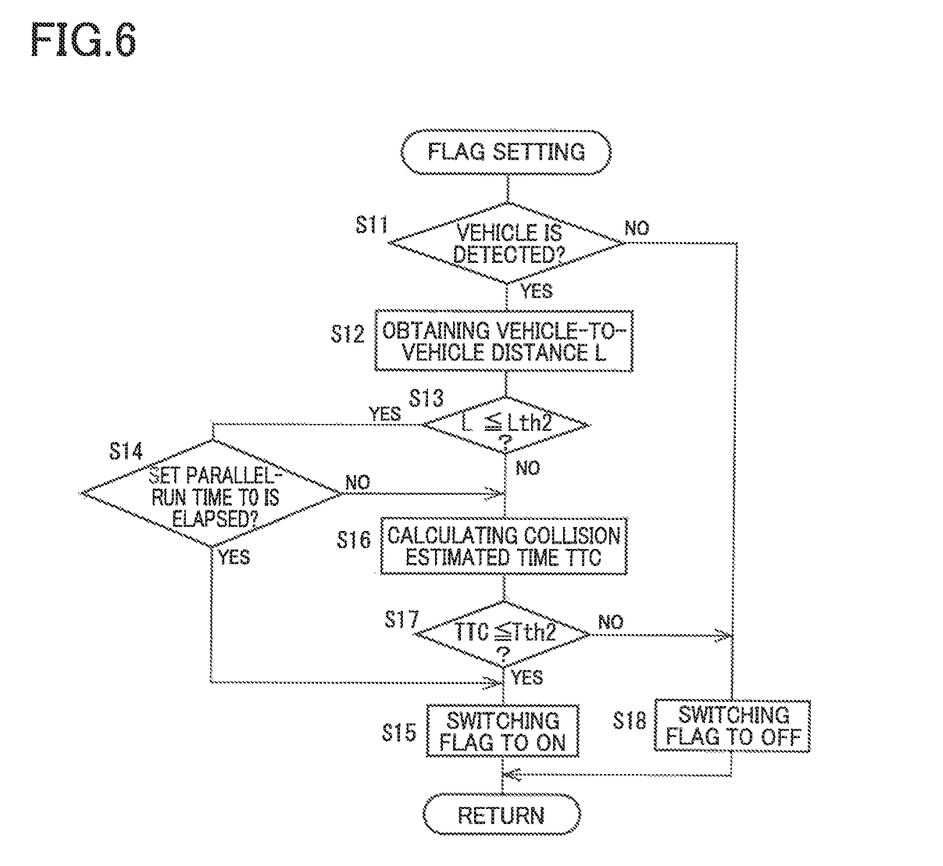
FIG. 6 is a flow chart illustrating a flag setting program stored in the storage of the BSM/LCA unit.

A flag setting program represented in the flow chart in FIG. 6 is executed by the BSM/LCA units 12 in parallel with the BSM/LCA program. At S11, it is determined whether the vehicle 36 is detected in the region Rm. When the vehicle 36 is detected, the vehicle-to-vehicle distance L is obtained at S12. At S13, it is determined whether the vehicle-to-vehicle distance L is less than or equal to the second vehicle-to-vehicle distance Lth2. When a positive decision (YES) is made at S13, it is determined at S14 whether the state has continued for longer than or equal to the set parallel-run time T0. When the state has continued for longer than or equal to the set parallel-run time T0, a positive decision (YES) is made at S14. At S15, the flag is switched to ON. In this case, it is considered that the vehicle-to-vehicle distance between the vehicle 36 and the own vehicle 8 is short, the relative velocity is low, and the own vehicle 8 and the vehicle 36 are running substantially in parallel. In contrast, when the state in which the vehicle 36 is located in the region R5 has not continued for longer than or equal to the set parallel-run time T0 or when the vehicle-to-vehicle distance L is greater than the second vehicle-to-vehicle distance Lth2, the collision estimated time TTC is obtained at S16, and it is determined at S17 whether the collision estimated time TTC is less than or equal to the second estimated time Tth2. When a positive decision (YES) is made at S17, the flag is switched to ON at S15. When a negative decision (NO) is made at S17, the flag is switched to OFF at S18.

Figure 3:
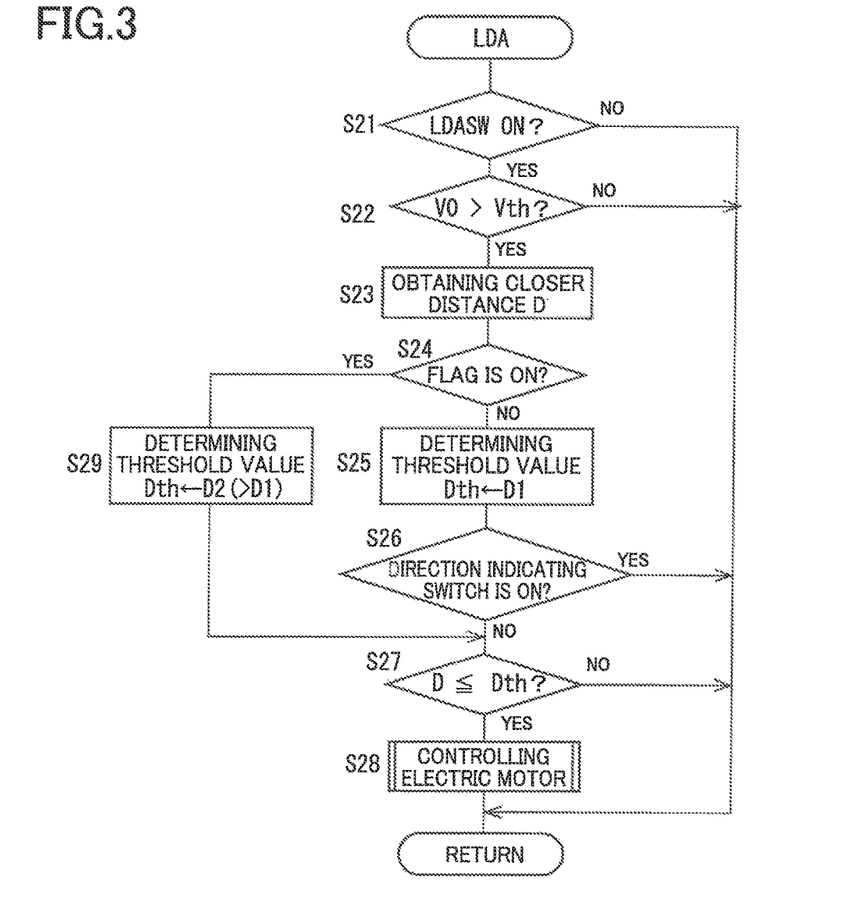
FIG. 3 is a flow chart illustrating a lane-departure-alert (LDA) program stored in a storage of an LDA unit of driving supporter.

The LDA control is executed according to an LDA program represented by the flow chart in FIG. 3. The LDA program is executed each time when a set length of time is elapsed. At S21, it is determined whether the LDA switch 48 is ON. When the LDA switch 48 is ON, it is determined at S22 whether a running speed V0 of the own vehicle 8 is greater than a set speed Vth. That is, the LDA control is executed when the running speed V0 of the own vehicle 8 is greater than the set speed Vth. When a positive decision (YES) is made at S22, the closer distance D between the own vehicle 8 and the lane boundary A is obtained at S23 based on the image taken by the front camera 40. It is determined at S24 whether the flag is ON. When the flag is OFF, a threshold value Dth for the closer distance D is determined at S25 to the first closer distance Dth1 that is shorter than or equal to the second closer distance Dth2. It is determined at S26 whether the direction indicating switch 16 is ON, that is, it is determined whether the direction indicating switch 16 has been operated by the driver. When the direction indicating switch 16 is not operated, and a negative decision (NO) is made at S26, it is determined at S27 whether the closer distance D is less than or equal to the first closer distance Dth1, in other words, it is determined whether the departure-possibility value is greater than or equal to the first threshold value. When a positive decision (YES) is made at S27, it is determined that the driver has no intension of lane change, and the departure-possibility value is greater than or equal to the first threshold value. The electric motor 18 is then controlled at S28 to execute the lane-departure prevention support.

When the closer distance D is greater than the first closer distance Dth1, a negative decision (NO) is made at S27, and the processing at S28 is not executed. This is because the departure-possibility value is smaller than the first threshold value, and accordingly there is low need to execute the lane-departure prevention support. When the direction indicating switch 16 is ON, a positive decision (YES) is made at S26, and the processing at S28 is not executed. This is because the driver has an intension of lane change, and accordingly there is no need to execute the lane-departure prevention support.

In contrast, when the flag is ON, a positive decision (YES) is made at S24, and the threshold value Dth is determined at S29 to the second closer distance Dth2 that is greater than the first closer distance Dth1. In this case, it is determined at S27 whether the closer distance D is less than or equal to the second closer distance Dth2, without detecting the ON/OFF state of the direction indicating switch 16. When the closer distance D is less than or equal to the second closer distance Dth2, it is determined that the departure-possibility value is greater than or equal the second threshold value, and the lane-departure prevention support is executed at S28.

In the present embodiment as described above, the LDA control is executed when the departure-possibility value is greater than or equal to the second threshold value and when the relative positional relationship between the own vehicle 8 and the vehicle 36 is the set relationship even in the case where the departure-possibility value is less than or equal to the first threshold value. This configuration results in increase in opportunities of execution of the LDA control, leading to improved safety. In the case where the departure-possibility value is less than the first threshold value, the LDA control is executed at the timing later than the timing at which the BSM control and the LCA control are executed. This operation reduces an annoyance to the driver well.

In the present embodiment, the departure-possibility-value obtainer 44, a lateral-deviation-amount obtainer, and a closer distance obtainer are constituted by portions of the controller 42 of the LDA unit 10 which store and execute the processing at S23 in the flow chart in FIG. 3, for example. The support controller 46 is constituted by portions of the controller 42 of the LDA unit 10 which store and execute the processings at S24-S29, for example. A first support controller 46a (FIG. 2) is constituted by portions of the support controller which store and execute the processings at S24-S28, for example. A second support controller 46b (FIG. 2) is constituted by portions of the support controller which store and execute the processings at S24 and S27-S29, for example. The portions of the support controller which store and execute the processing at S28 are also one example of a vehicle-to-vehicle-distance-dependent support controller and an estimated-time-dependent support controller. A threshold-value determiner is one example of portions of the support controller which store and execute the processing at S24, S25, and S29. A value (W/2-D1th) obtained by subtracting the first closer distance from the half of the width W of the lane is one example of a first lateral deviation amount. A value (W/2-D2th) obtained by subtracting the second closer distance from the half of the width W of the lane is one example of a second lateral deviation amount.

A relative positional relationship obtainer (the relative positional relationship obtainer 38 of the millimeter-wave radar 30) is constituted by portions of the BSM/LCA unit 12 which store and execute the processing at S3 and S8 in the BSM/LCA program represented by the flow chart in FIG. 5 and the processings at S12, S14, and S16 in the flag setting program represented by the flow chart in FIG. 6, for example. A vehicle-to-vehicle distance obtainer is constituted by portions of the relative positional relationship obtainer which store and execute the processings at S3 and S12, for example. A collision-estimated-time obtainer is constituted by portions of the relative positional relationship obtainer which store and execute the processings at S8 and S16, for example. A vehicle-to-vehicle-distance-dependent indication activator and an estimated-time-dependent indication activator (the LED controller 39) are constituted by portions of the controller 32 of the BSM/LCA unit 12 which store and execute the processings at S5-S7, for example.

While the embodiment has been described above, it is to be understood that the disclosure is not limited to the details of the illustrated embodiment, but may be embodied with various changes and modifications, which may occur to those skilled in the art, without departing from the spirit and scope of the disclosure. In the above-described embodiment, for example, when it is determined at S14 in the flag setting program that the state in which the vehicle-to-vehicle distance L is less than or equal to the second vehicle-to-vehicle distance Lth2 has continued for longer than equal to the set parallel-run time T0, the flag is switched to ON. However, the processing at S14 is not essential. When the vehicle-to-vehicle distance is less than or equal to the second vehicle-to-vehicle distance Lth2, the flag may be switched to ON.

The LDA control is not limited to the control in the above-described embodiment and may be executed in various manners. For example, in the LDA control, the wheels may be turned in such a direction that prevents departure of the vehicle from the lane, or a high possibility of departure of the vehicle from the lane may be recognized by the driver visually or aurally. The BSM control and the LCA control may also be executed in various manners and are not limited to the illumination and blink of the LED light 34. Control executed when the departure-possibility value is greater than or equal to the first threshold value and control executed when the departure-possibility value is greater than or equal to the second threshold value may be executed in different manners. For example, the magnitude of an output provided by the electric motor 18 may be different between the case where the departure-possibility value is greater than or equal to the first threshold value and the case where the departure-possibility value is greater than or equal to the second threshold value. The manner of operation of the indicator may be different between these cases. Alternatively, the driving supporter may be configured such that the electric motor 18 is controlled when the departure-possibility value is greater than or equal to the first threshold value, and the indicator such as the LED light 34 may be operated when the departure-possibility value is greater than or equal to the second threshold value.

The lateral deviation amount may be obtained based on a vehicle speed and a yaw rate of the own vehicle 8 and may be obtained with consideration of map information, for example. While the controllers are individually provided for the BSM/LCA unit 12 and the LDA unit 10 in the above-described embodiment, a single controller may be shared by the BSM/LCA unit 12 and the LDA unit 10.

CLAIMABLE INVENTIONS

There will be described claimable inventions.

(1) A driving supporter, comprising:
  a departure-possibility-value obtainer configured to obtain a departure-possibility value representing a degree of a possibility of departure of an own vehicle from a lane;
  a relative positional relationship obtainer configured to detect another vehicle located at a rear of and on a lateral side of the own vehicle and obtain a relative positional relationship between said another vehicle and the own vehicle;
  a support executer configured to execute a lane-departure prevention support; and
  a support controller configured to control the support executer to execute the lane-departure prevention support when the departure-possibility value obtained by the departure-possibility-value obtainer is greater than or equal to a threshold value,
  wherein the support controller comprises a threshold-value determiner configured to determine the threshold value to a smaller value when the relative positional relationship obtained by the relative positional relationship obtainer is a set relationship than when the relative positional relationship is not the set relationship, and
  wherein the set relationship is a relationship in which there is a possibility of collision of the own vehicle with said another vehicle in an event of departure of the own vehicle from the lane.

(2) The driving supporter according to the above form (1), wherein the support controller comprises:
  a first support controller configured to determine the threshold value to a first threshold value when the relative positional relationship is not the set relationship and to control the support executer when the departure-possibility value is greater than or equal to the first threshold value; and
  a second support controller configured to determine the threshold value to a second threshold value less than the first threshold value when the relative positional relationship is the set relationship and to control the support executer when the departure-possibility value is greater than or equal to the second threshold value.

For example, the support executer may include at least one of a power steering device and an indicator configured to indicate that there is a possibility of departure of the own vehicle from the lane. One example of the indicator is an alert device configured to produce an alert. Examples of the case where the relative positional relationship is not the set relationship include not only a case where there is another vehicle located diagonally to the rear of the own vehicle, and the relative positional relationship between said another vehicle and the own vehicle is not the set relationship, but also a case where there is no other vehicle.

(3) The driving supporter according to the above form (2), further comprising:
  an indicator; and
  an indication activator configured to activate the indicator when the relative positional relationship is a first set relationship,
  wherein the set relationship comprises a second set relationship that is a relationship having a greater tendency of decrease in distance between the own vehicle and said another vehicle than the first set relationship, and
  wherein the second support controller is configured to control the support executer when the relative positional relationship is the second set relationship, and the departure-possibility value is greater than or equal to the second threshold value.

Examples of the relationship having a greater tendency of decrease in distance include: a relationship in which the own vehicle and said another vehicle are close to each other (that is, the vehicle-to-vehicle distance is short); and a relationship in which the distance between the own vehicle and said another vehicle is decreasing at a high speed (that is, a collision estimated time is short). Thus, the second set relationship may be set to a relative positional relationship in which at least one of the vehicle-to-vehicle distance and the collision estimated time is less than that of the first set relationship. The indicator is configured to indicate the presence of another vehicle whose relative positional relationship with the own vehicle is the first set relationship.

(4) The driving supporter according to the above form (2) or (3),
  wherein the relative positional relationship obtainer comprises a vehicle-to-vehicle distance obtainer configured to obtain a vehicle-to-vehicle distance between said another vehicle and the own vehicle as the relative positional relationship,
  wherein the driving supporter comprises:
    an indicator; and
    a vehicle-to-vehicle-distance-dependent indication activator configured to activate the indicator when the vehicle-to-vehicle distance obtained by the vehicle-to-vehicle distance obtainer is less than or equal to a first vehicle-to-vehicle distance, and
  wherein the second support controller comprises a vehicle-to-vehicle-distance-dependent support controller configured to determine that the relative positional relationship is the set relationship and control the support executer, when the departure-possibility value is greater than or equal to the second threshold value and when the vehicle-to-vehicle distance is less than or equal to a second vehicle-to-vehicle distance less than the first vehicle-to-vehicle distance.

In the case where the departure-possibility value is less than the first threshold value, when the lane-departure prevention support is executed at the timing when the vehicleto-vehicle distance between the own vehicle and said another vehicle becomes less than or equal to the first vehicle-to-vehicle distance, some drivers feel annoyed. To solve this problem, the lane-departure prevention support is executed at the timing when the vehicle-to-vehicle distance becomes less than or equal to the second vehicle-to-vehicle distance, thereby reducing the annoyance to the driver. The indicator may or may not be the same device as the support executer. For example, the power steering device may be controlled to indicate that the vehicle-to-vehicle distance between the own vehicle and said another vehicle is less than or equal to the first vehicle-to-vehicle distance. It is noted that, in the driving supporter according to this form, the relationship in which the vehicle-to-vehicle distance is less than or equal to the first vehicle-to-vehicle distance corresponds to the first set relationship, and the relationship in which the vehicle-to-vehicle distance is less than or equal to the second vehicle-to-vehicle distance corresponds to the second set relationship.

(5) The driving supporter according to the above form (4), wherein the vehicle-to-vehicle-distance-dependent support controller is configured to determine that the relative positional relationship is the set relationship and control the support executer, when a state in which the vehicle-to-vehicle distance is less than or equal to the second vehicle-to-vehicle distance has continued for greater than or equal to a set parallel-run time.

In this configuration, the lane-departure prevention support is executed in the case where the own vehicle and said another vehicle are running substantially in parallel with each other, thereby further reducing the annoyance to the driver.

(6) The driving supporter according to any one of the above forms (2) through (5),
wherein the relative positional relationship obtainer comprises a collision-estimated-time obtainer configured to obtain a collision estimated time between said another vehicle and the own vehicle as the relative positional relationship,
wherein the driving supporter comprises:
an indicator; and
an estimated-time-dependent indication activator configured to activate the indicator when the collision estimated time obtained by the collision-estimated-time obtainer is less than or equal to a first estimated time, and
wherein the second support controller comprises an estimated-time-dependent support controller configured to determine that the relative positional relationship is the set relationship and control the support executer, when the departure-possibility value is greater than or equal to the second threshold value and when the collision estimated time is less than or equal to a second estimated time less than the first estimated time.

In this driving supporter, the lane-departure prevention support is executed when the departure-possibility value is greater than or equal to the second threshold value, and the collision estimated time is less than or equal to the second estimated time. This configuration can reduce the annoyance to the driver when compared with a case where the lane-departure prevention support is executed when the collision estimated time is less than or equal to the first estimated time. In the driving supporter according to this form, the relationship in which the collision estimated time is less than or equal to the first estimated time corresponds to the first set relationship, and the relationship in which the collision estimated time is less than or equal to the second estimated time corresponds to the second set relationship. The vehicle-to-vehicle-distance-dependent indication activator and the estimated-time-dependent indication activator may or may not be constituted by the same device. In other words, the indicator may be operated in the same manner or different manners between the case where the vehicle-to-vehicle distance is less than or equal to the first vehicle-to-vehicle distance and the case where the collision estimated time is less than or equal to the first estimated time.

(7) The driving supporter according to any one of the above forms (2) through (6),
wherein the departure-possibility-value obtainer comprises a lateral-deviation-amount obtainer configured to obtain a lateral deviation amount that is an amount of deviation of the own vehicle in a lateral direction,
wherein the first support controller is configured to determine that the departure-possibility value is greater than or equal to the first threshold value and control the support executer, when the lateral deviation amount obtained by the lateral-deviation-amount obtainer is greater than or equal to a first lateral deviation amount, and
wherein the second support controller is configured to determine that the departure-possibility value is greater than or equal to the second threshold value when the lateral deviation amount is greater than or equal to a second lateral deviation amount less than the first lateral deviation amount and to control the support executer when the relative positional relationship is the set relationship.

(8) The driving supporter according to the above form (7), wherein the lateral-deviation-amount obtainer comprises a closer distance obtainer configured to obtain a closer distance based on an image taken by an image taking device provided on a front portion of the own vehicle, the closer distance being a distance between a lane boundary and the own vehicle.

(9) The driving supporter according to any one of the above forms (2) through (8),
wherein the own vehicle comprises a change-intention estimator configured to estimate whether a driver has an intention of lane change,
wherein the first support controller is configured to control the support executer when the change-intention estimator has estimated that the driver has no intention of the lane change and when the departure-possibility value is greater than or equal to the first threshold value, and
wherein the second support controller is configured to control the support executer regardless of whether the driver has an intention of the lane change, when the departure-possibility value is greater than or equal to the second threshold value and when the relative positional relationship is the set relationship.

The presence or absence of the intention of the driver to perform lane change may be estimated based on an ON/OFF state of a direction indicating switch and/or a magnitude of an operating force applied to a steering operation member. In the case where it is estimated that the driver has an intention of lane change, it is preferable that execution of the lane-departure prevention support is made more difficult even when the departure-possibility value is high. In contrast, in the case where the relative positional relationship between the own vehicle and said another vehicle is the set relationship, for example, in the case where there is a high possibility of collision between the own vehicle and another vehicle located diagonally to the rear of the own vehicle in the event of departure of the own vehicle from the lane, it is preferable to execute the lane-departure prevention support regardless of the presence or absence of the intention of lane change. Examples of the wordings "the second support controller is configured to control the support executer regardless of whether the driver has an intention of the lane change" include: a configuration in which the second support controller controls the support executer without estimation of the change-intention estimator; and a configuration in which the second support controller is configured to control the support executer regardless of a result of estimation of the change-intention estimator.

What is claimed is:

1. A driving support apparatus, comprising:
a sensor; and
a controller, wherein the controller is configured to function as:
a lateral-deviation-amount obtainer that obtains a lateral deviation amount that is an amount of deviation of an own vehicle in a lateral direction from a center line of a lane on which the own vehicle is running;
a vehicle-to-vehicle distance obtainer that detects, based on information from the sensor, another vehicle located diagonally at a rear of the own vehicle and obtains a vehicle-to-vehicle distance between said another vehicle and the own vehicle;
a collision-estimated-time obtainer that obtains a collision estimated time that is obtained by dividing the vehicle-to-vehicle distance obtained by the vehicle-to-vehicle distance obtainer, by a first velocity of said another vehicle relative to a second velocity of the own vehicle; a support controller that controls a steering device of the own vehicle to assist in operation of the steering device in a direction in which departure of the own vehicle from the lane is prevented based on one or more of: the lateral deviation amount obtained by the lateral-deviation-amount obtainer, an estimated intention of lane change of a driver of the own vehicle, the collision estimated time, and the vehicle-to-vehicle distance; and
a change-intention estimator that estimates whether the driver has the intention of lane change based on an ON state of a direction indicating switch or a magnitude of an operating force applied to the steering device being above an operating force threshold,
wherein the controller is further configured to functions as:
a threshold-value-changer that sets a support controller threshold value to a first threshold value in a first case where the vehicle-to-vehicle distance obtained by the vehicle-to-vehicle distance obtainer is greater than a set vehicle-to-vehicle distance, and the collision estimated time obtained by the collision-estimated-time obtainer is greater than a set estimated time, and that sets the support controller threshold value to a second threshold value less than the first threshold value in a second case where the vehicle-to-vehicle distance is less than or equal to the set vehicle-to-vehicle distance, or the vehicle-to-vehicle distance is greater than the set vehicle-to-vehicle distance but the collision estimated time is less than or equal to the set estimated time;
a first support controller that in the first case controls the steering device when the change-intention estimator has estimated that the driver has no intention of lane change, and the lateral deviation amount obtained by the lateral-deviation-amount obtainer is greater than the first threshold value, and that in the first case does not control the steering device even when the lateral deviation amount obtained by the lateral-deviation-amount obtainer is greater than the first threshold value in a first situation where the change-intention estimator has estimated that the driver has an intention of lane change; and
a second support controller that in the second case controls the steering device even when the change-intention estimator has estimated that the driver has an intention of lane change in a second situation where the lateral deviation amount obtained by the lateral-deviation-amount obtainer is greater than the second threshold value.

2. The driving support apparatus according to claim 1, further comprising:
an indicator,
wherein the controller is further configured to function as
a vehicle-to-vehicle-distance-dependent indication activator that activates the indicator when the vehicle-to-vehicle distance obtained by the vehicle-to-vehicle distance obtainer is less than or equal to a first vehicle-to-vehicle distance that is greater than the set vehicle-to-vehicle distance, and
wherein the second support controller further functions as
a vehicle-to-vehicle-distance-dependent support controller that controls the steering device when the lateral deviation amount obtained by the lateral-deviation-amount obtainer is greater than or equal to the second threshold value and when the vehicle-to-vehicle distance is less than or equal to the set vehicle-to-vehicle distance.

3. The driving support apparatus according to claim 2, wherein the vehicle-to-vehicle distance-dependent support controller controls the steering device when the vehicle-to-vehicle distance has continued to be less than or equal to the set vehicle-to-vehicle distance for greater than or equal to a set parallel-run time.

4. The driving supporting apparatus according to claim 1, further comprising:
an indicator,
wherein the controller is further configured to function as
an estimated-time-dependent indication activator that activates the indicator when the collision estimated time obtained by the collision estimated-time obtainer is less than or equal to a first estimated time that is greater than the set estimated time, and
wherein the second support controller further functions as
an estimated-time-dependent support controller that controls the steering device when the lateral deviation-amount obtained by the lateral-deviation-amount obtainer is greater than or equal to the second threshold value and when the collision estimated time obtained by the collision-estimated-time obtainer is less than or equal to the set estimated time.

5. A driving support apparatus, comprising:
a sensor; and
a controller, wherein the controller is configured to function as:
a closer distance obtainer that obtains a closer distance that is a distance between a reference point of an own vehicle and a lane boundary that is a boundary of a lane on which the own vehicle is running;
a vehicle-to-vehicle distance obtainer that detects, based on information from the sensor, another vehicle located diagonally at a rear of the own vehicle and obtains a vehicle-to-vehicle distance between said another vehicle and the own vehicle;

a collision-estimated-time obtainer that obtains a collision estimated time that is obtained by dividing the vehicle-to-vehicle distance obtained by the vehicle-to-vehicle distance obtainer, by a first velocity of said another vehicle relative to a second velocity of the own vehicle;

a support controller that controls a steering device of the own vehicle to assist in operation of the steering device in a direction in which departure of the own vehicle from the lane is prevented based on one or more of: the closer distance obtained by the closer distance obtainer, an estimated intention of lane change of a driver of the own vehicle, the collision estimated time, and the vehicle-to-vehicle distance; and a change-intention estimator that estimates whether the driver has the intention of lane change based on an ON state of a direction indicating switch or a magnitude of an operating force applied to the steering device being above an operating force threshold, wherein the controller is further configured to function as:

a threshold-value changer that sets a support controller threshold value to a first threshold value in a first case where the vehicle-to-vehicle distance obtained by the vehicle-to-vehicle distance obtainer is greater than a set vehicle-to-vehicle distance, and the collision estimated time obtained by the collision-estimated-time obtainer is greater than a set estimated time, and that sets the support controller threshold value to a second threshold value greater than the first threshold value in a second case where the vehicle-to-vehicle distance is less than or equal to the set vehicle-to-vehicle distance, or the vehicle-to-vehicle distance is greater than the set vehicle-to-vehicle distance but the collision estimated time is less than or equal to the set estimated time;

a first support controller that in the first case controls the steering device when the change-intention estimator has estimated that the driver has no intention of lane change, and the closer distance obtained by the closer distance obtainer is less than the first threshold value, and that in the first case does not control the steering device even when the closer distance obtained by the closer distance obtainer is less than the first threshold value in a first situation where the change-intention estimator has estimated that the driver has an intention of lane change; and a second support controller that in the second case controls the steering device even when the change-intention estimator has estimated that the driver has an intention of lane change in a second situation where the closer distance obtained by the closer distance obtainer is less than the second threshold value.

\* \* \* \* \*